Sept. 17, 1946. R. O. NEMEYER 2,407,845
ALIGNING DEVICE FOR TOOLS
Filed Jan. 16, 1943
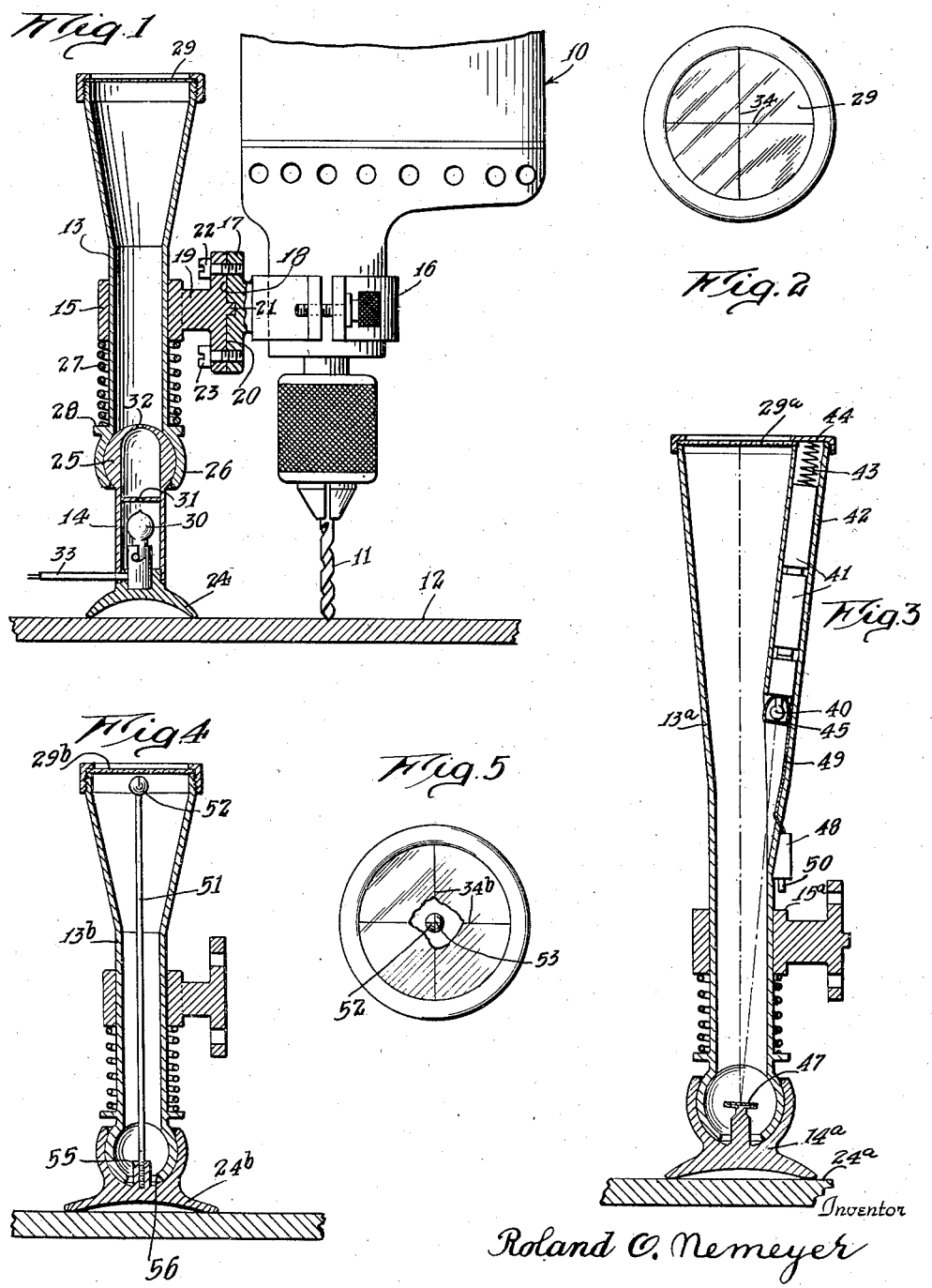
Inventor
Roland O. Nemeyer
By Lyon & Lyon
Attorneys Patented Sept. 17, 1946

2,407,845

UNITED STATES PATENT OFFICE 2,407,845

ALIGNING DEVICE FOR TOOLS

Roland Orisan Nemeyer, Pasadena, Calif., assignor to California Institute Research Foundation, Pasadena, Calif., a corporation of California Application January 16, 1943, Serial No. 472,601

7 Claims. (Cl. 116—124)

1

This invention relates to portable tools, such as hand or electric drills, in which the maintenance of the proper angle of incidence of the tool against the work is dependent upon the skill of the operator, as distinct from tools such as drill presses in which the tool is mechanically supported at the desired angle of incidence with respect to the work.

A general object of the invention is to facilitate the positioning of a hand tool at a desired angle with respect to the work.

A more specific object is to provide a practicable accessory for a hand tool for giving an accurate visual indication of the angle of incidence of the tool with respect to the work at all times, thereby enabling even unskilled operators to perform accurate work.

Briefly, the present invention comprises an indicating attachment which can be secured to hand tools, such as portable drills, and has a work contacting face, which lies flat against the work, in combination with visual indicating means for showing any variations in the angle of the tool with respect to the work.

A clearer understanding of the invention may be had from the following detailed description, with reference to the drawing, of several possible arrangements of the invention.

In the drawing:

Fig. 1 is an elevation view, partly in section, of one form of the invention shown attached to a portable electric drill;

Fig. 2 is a plan view of the indicating face of the attachment;

Fig. 3 is a vertical section showing a modification of the instrument of Figure 1;

Fig. 4 is a vertical section showing still another modification, and

Fig. 5 is a plan view of the indicating face of the attachment shown in Figure 4.

Referring first to Fig. 1, there is shown a portable electric drill 10 having a drill point 11 in contact with a workpiece 12, which is here shown as a flat plate. Ordinarily it is desirable if not essential that holes drilled in objects such as the plate 12 be perpendicular to the surface. It requires cons:derable skill for operators to drill holes that are even approximately perpendicular when using an ordinary portable drill of the type illustrated. The present invention provides an attachment for such drills that indicates exactly to the operator at all times whether or not the drill is perpendicular and, if it is not, in which direction it must be moved to bring it back to the perpendicular.

2

Essential elements of the attachment are a tubular member 13, a work contacting member 14, and a supporting sleeve 15 which slidably supports the tubular member 13 for linear movement. The sleeve 15 is adjustably connected to the drill 10 by a clamp 16. Thus, the clamp 16 is provided with a bracket 17 having a flat face 18 and the sleeve 15 is provided with a similar bracket 19 having a flat face 20 fitting against the face 18. The two brackets 17 and 19 are held in alignment by a pin 21 which projects from the face 20 into a recess provided therefor in the face 18. The two brackets are adjustably held together by screws 22 and 23 which pass through arcuate slots in the bracket 19 and into threaded apertures in the bracket 17. The construction described permits rotation of the sleeve 15 at various angles with respect to the axis of the drill point 11 but for ordinary work the sleeve 15 is adjusted to bring its axis parallel to the axis of the drill point 11.

As shown in Fig. 1, the end of the drill point 11 is resting against the workpiece 12 and likewise a face 24 of the member 14 is lying against the workpiece 12 so that the member 14 has its axis positioned perpendicular to the workpiece even though the drill 10 may be inclined at some other angle. Relative angular movement between the member 14 and the tubular member 13 is possible by virtue of the fact that they are pivotally connected together with a ball and socket joint, a ball 25 being formed on the upper end of member 14 and a socket 26 being formed on the lower end of the tubular member 13. Furthermore the member 13 is always urged downwardly to hold the face 24 against the work by a helical compression spring 27 which surrounds the tubular member 13 and is compressed between the lower end of the sleeve 15 and a shoulder 28 on the upper end of the socket 26.

To provide a visual indication of the relative angular positions of the members 13 and 14, the member 13 is provided with a translucent screen 29 at its upper end and the member 14 is provided with a light projecting apparatus for projecting a narrow beam of light onto the screen 29. Thus a small electric lamp 30 is positioned within the member 14 and aligned with two light transmitting apertures 31 and 32 in the ball 25 which transmit a narrow beam of light onto the screen 29. The lamp 30 may be energized from any surce of current over a flexible cord 33.

When the drill 10 is held so that the drill point 11 is perpendicular to the workpiece 12, the ray of light projected through the apertures 31 and 32 will fall on the center of the translucent screen 29, causing a spot of light there that is readily visible to the operator. To make it easier to locate the center of the disc, the latter may be provided with crossed lines 34, as shown in Fig. 2. Any deviation of the drill from the normal position will be immediately indicated to the operator by departure of the spot of light away from the center of the screen 29.

In the modification of the invention shown in Fig. 3, the source of light, instead of being positioned in the work-contacting member, is positioned within the tubular member 13a and consists of a small flash lamp 40 of the focusing type, energized from batteries 41, mounted in a conventional small flashlight case 42 and held in position by a spring 43 compressed between the upper battery and an end closure 44, the latter being located adjacent the translucent screen 29a. The lamp 40 has associated therewith a reflector 45 for reflecting a narrow beam of light downwardly through the tube 13a onto a mirror 47 secured to the work contacting member 14a. The mirror 47 reflects the beam of light back up through the tube 13a onto the translucent screen 29a, and the mirror 47 is so oriented that the beam of light falls on the center of the screen when the tubular member 13a is perpendicular to the plane of the work contacting face 24a.

It is desirable that the lamp 40 be energized only while the tool is in actual use, to prolong the life of the batteries 41. Hence I may provide an automatic mechanism for lighting the lamp 40 only while the device is in actual use. This may consist of a switch 48, which is connected by wires 49 to the lamp 40 and has an actuating plunger 50. The switch 48 is so designed that the plunger 50 is urged outwardly by spring pressure to close the switch and light the lamp 40. Hence in the condition shown in Fig. 3, the lamp 40 is illuminated. However, when the tool is removed from the workpiece, the spring 27a moves the tubular member 13a downwardly until the plunger 50 encounters the top of the collar 15a, thereby depressing the plunger and shutting off the lamp.

There is shown in Fig. 4 a further modification of the invention, in which the indicating lamp is avoided and a purely mechanical indicating structure substituted therefor. Thus, in this instance the work contacting member 24b has secured thereto a pointer 51 which extends up through the tubular member 13b and terminates immediately below a window 29b which is preferably clear but has crossed lines 34b (Fig. 5), the same as did the translucent screens 29 and 29a. As shown in the drawing, the upper end of the pointer 51 carries an indicating ball 52, which itself carries intersecting lines 53 on its upper end to facilitate alignment with the crossed lines 34b of the window. However, the upper end of the pointer 51 could terminate in a point instead of a ball if desired. The operation of the modification shown in Fig. 4 is obvious. The pointer 51, being rigidly secured to the work contacting member 24b, will remain perpendicular to the work whereas any angular deviation of the hand tool on which the device is mounted will shift the tubular member 13b and the window 29b and such shift will be immediately apparent to the operator.

It is desirable, to prevent the pointer 51 from being bent, to limit the extent of angular movement between the ball and socket members by providing a sturdy boss 55 on the socket member, which will be contacted by the edge 56 of the socket member before the tubular member 13b would be deflected far enough to carry it into direct contact with the pointer 51.

The structures shown in Figs. 3 and 4 have the advantage over the structure shown in Fig. 1 in that the ball and socket joint is positioned closer to the workpiece, thereby more positively assuring that the work-contacting face of the member will lie flat against the work. As shown in all the modifications, the work-contacting face is concave so that it contacts the work along a circle, which may be more desirable than a flat contact face in the presence of dirt or other loose foreign matter. In fact a three-point contact might desirably be substituted for the circle contact in many instances.

Although the attachment is shown for use only in connection with a portable drill, it will be observed that it is useful in connection with other types of tools. Thus, it would be used in a very similar manner on a reamer or a tap. It might also have application to portable sanders, saws and the like, wherever it is desirable to maintain a tool in predetermined angular relation with respect to the work. The invention is, therefore, not to be limited to the exact construction shown in the drawing but only as limited in the appended claims.

I claim:

1. The combination with a hand tool adapted to move with respect to a workpiece, while maintaining a desired angle of incidence with respect to said workpiece, of means associated with said hand tool for indicating deviation from said desired angle of the tool with respect to said workpiece, said indicating means comprising: a first member; means for slidably mounting said first member relative to said tool along an axis disposed in fixed angular relation thereto; a second member having a face adapted to lie against the workpiece in predetermined angular relationship therewith; a ball and socket joint pivotally interconnecting said first and second members, whereby said members assume relative angular positions corresponding to the relative angular positions of said tool and workpiece; and index means for indicating the relative angular positions of said members including a screen on said first member, and means on said second member for projecting an indication through said ball and socket joint onto said screen.

2. The combination with a hand tool adapted to move with respect to a workpiece, while maintaining a desired angle of incidence with respect to said workpiece, of means associated with said hand tool for indicating deviation from said desired angle of the tool with respect to said workpiece, said indicating means comprising: a first member; means for slidably mounting said first member relative to said tool along an axis disposed in fixed angular relation thereto; a second member having a face adapted to lie against the workpiece in predetermined angular relationship therewith; a ball and socket joint pivotally interconnecting said first and second members, whereby said members assume relative angular positions corresponding to the relative angular positions of said tool and workpiece; and index means for indicating the relative angular positions of said members, said index means including a screen on said first member and a source of light on said second member for projecting a ray of light through said ball and socket joint onto said screen.

3. The combination with a hand tool adapted to move with respect to a workpiece, while maintaining a desired angle of incidence with respect to said workpiece, of means associated with said hand tool for indicating deviation from said desired angle of the tool with respect to said workpiece, said indicating means comprising: a first member; means for slidably mounting said first member relative to said tool along an axis disposed in fixed angular relation thereto; a second member having a face adapted to lie against the workpiece in predetermined angular relationship therewith; a ball and socket joint pivotally interconnecting said first and second members, whereby said members assume relative angular positions corresponding to the relative angular positions of said tool and workpiece; and index means for indicating the relative angular positions of the first and second members including a screen on one of said members and a source of light on the other of said members for projecting a beam of light onto said screen.

4. An attachment for a hand tool which comprises: a first member; a clamp member having a clamp attachable to said hand tool and a sleeve slidably supporting said first member on said clamp member for movement along a predetermined axis relative to said hand tool; spring means normally urging said first member toward an extended position; a second member carried by said first member and having a face adapted to bear against the workpiece in predetermined angular relationship therewith; a ball and socket joint between the first and second members whereby the first and second members may assume relative angular positions corresponding to the relative angular positions of the hand tool and workpiece; and cooperative indicating means on the first and second members for indicating their relative angular positions.

5. Aligning device for hand drills adapted to indicate the angle of incidence of the hand drill with respect to a workpiece, said aligning device comprising: a bracket secured to the hand drill, a tube slidable in said bracket along an axis occupying a predetermined relationship to the drilling axis of the hand drill; a foot member adapted to rest on a workpiece to be drilled and defining an axis having a predetermined angular relationship with the surface of the workpiece; a hollow universal joint connecting said foot member and tube; yieldable means for urging said tube and foot member to an extended position relative to said hand drill whereby said foot member bears against the workpiece as the hand drill is moved into engagement therewith; and cooperative indicating means on the tube and foot member for indicating their relative angular positions.

6. Aligning device for hand drills adapted to indicate the angle of incidence of the hand drill with respect to a workpiece, said aligning device comprising: a bracket secured to the hand drill, a tube slidable in said bracket along an axis occupying a predetermined relationship to the drilling axis of the hand drill; a foot member adapted to rest on a workpiece to be drilled and defining an axis having a predetermined angular relationship with the surface of the workpiece; a hollow universal joint connecting said foot member and tube; yieldable means for urging said tube and foot member to an extended position relative to said hand drill whereby said foot member bears against the workpiece as the hand drill is moved into engagement therewith; an index means for indicating the relative angular positions of said tube and foot member, said index means including a screen at the end of said tube remote from said foot member and a source of light within said foot member for projecting a ray of light through said universal joint onto said screen.

7. Aligning device for hand drills adapted to indicate the angle of incidence of the hand drill with respect to a workpiece, said aligning device comprising: a bracket secured to the hand drill, a tube slidable in said bracket along an axis occupying a predetermined relationship to the drilling axis of the hand drill; a foot member adapted to rest on a workpiece to be drilled and defining an axis having a predetermined angular relationship with the surface of the workpiece; a hollow universal joint connecting said foot member and tube; yieldable means for urging said tube and foot member to an extended position relative to said hand drill whereby said foot member bears against the workpiece as the hand drill is moved into engagement therewith; and an indicating device incorporating a viewing element at the end of said tube remote from said foot member and means carried within said foot member and co-acting with said viewing element to indicate the angular relation between said tube and said foot member thereby to indicate the angular relation between said hand drill and workpiece.

ROLAND ORISAN NEMEYER.